United States Patent [19]

Rishel

[11] Patent Number: 4,945,491

[45] Date of Patent: * Jul. 31, 1990

[54] MONITOR AND CONTROL FOR A MULTI-PUMP SYSTEM

[75] Inventor: James B. Rishel, Cincinnati, Ohio

[73] Assignee: Systecon, Inc., Cincinnati, Ohio

[*] Notice: The portion of the term of this patent subsequent to Feb. 14, 2006 has been disclaimed.

[21] Appl. No.: 276,764

[22] Filed: Nov. 28, 1988

Related U.S. Application Data

[63] Continuation of Ser. No. 10,708, Feb. 4, 1987, Pat. No. 4,805,118.

[51] Int. Cl.[5] .......................... G01F 1/00; G05B 11/01
[52] U.S. Cl. .................................... 364/510; 364/140; 417/19; 417/20; 340/606; 73/195
[58] Field of Search ............... 364/509, 510, 140, 148, 364/156; 417/18-20, 26, 43, 53, 300; 340/606; 73/195, 198, 199, 861.42, 863, 863.01, 863.02, 863.03

[56] References Cited

U.S. PATENT DOCUMENTS

| | | | |
|---|---|---|---|
| 3,068,796 | 4/1962 | Pfluger et al. | 137/18 |
| 3,994,623 | 12/1976 | Rutshtein et al. | 417/19 |
| 4,108,574 | 7/1978 | Bartley et al. | 417/19 |
| 4,120,033 | 10/1978 | Corso et al. | 364/510 |
| 4,178,132 | 12/1979 | Shiraishi et al. | 417/53 |
| 4,581,707 | 4/1986 | Millar | 364/509 |
| 4,584,654 | 4/1986 | Crane | 364/550 |
| 4,642,992 | 2/1987 | Julovich | 364/140 |
| 4,729,236 | 3/1988 | Samborsky | 364/510 |
| 4,805,118 | 2/1989 | Rishel | 364/510 |

OTHER PUBLICATIONS

Systecon, Bulletin No. 6.302-1 (Jun. 1980).
Systecon, Bulletin No. 6.007 (1980).
Systecon, Bulletin No. 6.008 (1980).
Systecon, 2.022A-INS. and Attachments (2.022A, 2.504-2.506) (1977).
Rishel, *Water Pumping System Economic Evaluation* (1978).
Systecon, Bulletin No. 8.220-1 (1978).
Systecon, Bulletin No. 2.119-1 to 2.119-5 (1977).
Systecon, Application Bulletin 7.108 (1977).
Systecon, Bulletin No. 7.112-1 (1979).
Systecon, Bulletin No. 7. 113-1 (1979).
Systecon, Bulletin No. 7.312-1 (1979).
Systecon, Bulletin No. 7.320-1 (1979).
Rishel, *Water System Head Analysis*, Plant Engineering (10/13/77).
Systecon, Bulletin No. 1.801-1 (1979).
Rishel, *Packaged Pumping Systems*, Plant Engineering (6/26/80).
Systecon, Drawing Nos. 120274 and 20175 (Nov. 1978).
Systecon, Drawing (Nov. 1978).
Systecon, Drawing No. 101178 (Nov. 1978).
Systecon, Drawing No. 10379 (Nov. 1978).
Systecon, Drawing No. 10479 (Nov. 1978).
Systecon, Bulletin No. 7.109a (Sep. 1980).
Systecon, Bulletin Nos. 85-5901, Part 1 & 85-5010B (VWV Installation) (1979).
Systecon, Bulletin No. 85-5300 (1979).
Rishel, *Wire-To-Wire Efficiency of Water Pumping Systems* (1976).
System proposed to City of New Haven in 1985.

*Primary Examiner*—Parshotam S. Lall
*Assistant Examiner*—Brian M. Mattson
*Attorney, Agent, or Firm*—Wood, Herron & Evans

[57] ABSTRACT

Wire-to-water efficiency (W) of a multi-pump system is monitored and accurately determined according to the formula:

$$W = \frac{Q \times HS}{K \times E}$$

wherein Q is flow through the system, HS is total dynamic head across the inlet and outlet headers of the system, E is energy input to the system to drive the pump, and K is a predetermined conversion factor. The resulting efficiency determination is provided to an operator so that the pump system may be monitored.

14 Claims, 4 Drawing Sheets

MONITOR AND CONTROL FOR A MULTI-PUMP SYSTEM

RELATED APPLICATIONS

This application is a continuation of my pending application of the same title filed Feb. 4, 1987, Ser. No. 07/010,708, now U.S. Pat. No. 4,805,118.

BACKGROUND OF THE INVENTION

I. Field of the Invention

The present invention relates to a method and apparatus by which the efficiency of a multi-pump pumping system may be accurately determined, and the individual pumps thereof selectively energized and deenergized to optimize the efficiency of the system.

II. Description of the Prior Art

A typical pumping system may comprise a plurality of valves, fittings and pumps coupled between an inlet header of the system and an outlet header thereof. The pumps may be in parallel such that each pump suction port communicates directly, or through one or more valves, with the inlet header, and each pump discharge port communicates directly, or through one or more valves, with the outlet header. Alternatively, the pumps may be in series such that the suction port of a first pump is coupled to the inlet header, the discharge port of the first pump is coupled to the suction port of a succeeding pump, the discharge port of the last pump is coupled to the outlet header, and valves are supplied to control communication between the pumps and between the system headers. In both systems, the valves, pumps and headers would typically be coupled together with fittings or the like.

With either type of system, whether parallel or series, it has been known to selectively energize and deenergize selected ones of the pumps and to open or close related valves. By way of example, such selective control has been known for maintaining a predetermined range of flow through the system, a predetermined range of pressure at a delivery point downstream of the outlet header, or a sump level at the input header. Additionally, where the pumping system utilizes variable speed pumps, it has been known to control the speed of the energized pumps so as to maintain a system parameter constant such as at a delivery point. Such a system parameter might be pressure, flow, temperature, or elevation or the like, but is not necessarily limited thereto.

In effecting the selective energization and deenergization of the pumps, it might occur that energizing an additional pump in order to maintain flow, level or pressure or the like results in inefficient operation of the pumps and, thus, costly energy waste. Indeed, it is known that one new pump may be more efficient than two new pumps at certain rates of flow through the pumping system, whereas as the system ages two may become more efficient than one. Other factors may also affect individual pump performance and, hence, efficiency. As a consequence, it has been proposed to monitor pumping systems to continuously determine the so-called wire-to-water efficiency of the pumping system whereby over time the performance of the pumps may be evaluated and appropriate selection and/or replacement of pumps made in an effort to obtain the best possible efficiency for the system.

The wire-to-water efficiency determination for a single pump system has been previously proposed according to the formula:

$$W = \frac{Q \times (H - OP)}{E}$$

wherein
W is wire-to-water efficiency;
Q is flow rate through the system;
H is pump head or differential pressure across the pump, i.e., between pump suction and pump discharge;
OP is the overpressure downstream of the outlet header (typically=0 or ignored for variable speed pumps); and
E is energy input to the system to drive the pump(s).
As explained in U.S. Pat. No. 4,120,033, the disclosure of which is incorporated herein by reference, the above described wire-to-water efficiency could be utilized to design, modify and/or control a pumping system.

Of importance is that the efficiency is determined by looking at the pump head, i.e. directly across the suction and discharge ports of the pump itself. Even in a multi-pump system, efficiency has traditionally been measured by looking at the individual pump heads or pump differential pressures between each of the suction and discharge ports thereof as shown, for example, in U.S. Pat. No. 4,584,654.

Such an approach requires numerous (and costly) transducers and communication equipment and/or may lead to erroneous efficiency determinations. For example, in order to evaluate pump head H for the purpose of determining efficiency, particularly in a parallel pump system, the pump head for only one of the pumps should be utilized. Thus, either one pump could be arbitrarily monitored or all the pumps could be monitored and the largest pump head, for example, selected. In any event, the selected pump head would be assumed to be the same for the other pumps. Not only does such an approach increase cost where all pumps are monitored but also increases complexity because of the circuitry required to determine which pump head to utilize. Moreover, utilizing only one pump head could lead to substantial inaccuracies in determining wire-to-water efficiency.

An additional problem with the foregoing efficiency determination is that it could lead to erroneous system design criteria as well. The foregoing typically did not account for certain system frictional losses such as losses due to valves and/or fittings. Rather, such losses were assumed to be constant at a given flow and/or pump head for the system and the designer might therefore include a fixed "fudge factor" into the pump system design criteria to account for such unknown losses Not only might the fudge factor be in error, for any given condition, it may not be possible to develop a fudge factor which is satisfactory for all conditions. Thus, errors could abound.

SUMMARY OF THE INVENTION

The method and apparatus provided by the present invention are believed to overcome the above drawbacks. In particular, with the method and apparatus of the present invention, only one set of pump head transducers need be employed. Further, a fudge factor is not necessary yet wire-to-water efficiency may be more accurately determined in a multi-pump system than is believed to have been heretofore accomplished. Moreover, with the method and apparatus of the present invention, selected pumps within a pumping system may be selectively energized and deenergized according to the accurately determined wire-to-water efficiency whereby to operate the pumping system more efficiently.

Thus, in accordance with the present invention and in its broadest aspect, an apparatus and method for monitoring a pumping system is provided in which the wire-to-water efficiency of the system is determined with regard to the total dynamic head HS (i.e. from inlet to outlet header) rather than with regard to a heretofore utilized pump head H. Thus, in the present invention, only one head or differential pressure measurement is taken which includes any system losses due to fittings and valves and the like between the headers and does not rely upon error-inducing assumption in arriving at an accurate determination of wire-to-water efficiency. The inclusion of system losses is important because Applicant has determined that such losses are not constant but may vary with the number of pumps energized even at a given flow or total dynamic head. Thus, Applicant believes that failure to include such losses in the actual wire-to-water efficiency determination may have led to erroneous data from which to design and/or control pumping systems Also, because accurate wire-to-water efficiency determinations may now be made with one set of pump head transducers, the cost and complexity of multiple transducer monitoring is eliminated.

With particular reference to the present invention, wire-to-water efficiency may now be accurately determined by the formula:

$$W = \frac{Q \times HS}{K \times E}$$

wherein HS is the total dynamic head which is the differential pressure (DP) from inlet to outlet header minus any overpressure (OP) downstream of the outlet header (assumed = 0 for variable pump systems), and K is a predetermined conversion factor so that W results in a percentage from 0–100%. Thus, in accordance with the present invention, method and apparatus are provided to monitor a pumping system wherein the flow Q of the system is measured, total dynamic head HS between the headers is measured, and energy E input to the system to drive the pumps is measured and the efficiency is determined according to the above formula. Where the pumping system is a fixed speed system, HS is determined by measuring differential pressure (DP) across the headers and subtracting therefrom an overpressure (OP) measured downstream of the outlet header For a variable speed system with proper control, however, HS may be assumed equal to the system differential pressure DP Utilizing the foregoing wire-to-water determination, the present invention further provides an apparatus for and method of selectively energizing and deenergizing selected ones of the pumps in order to optimize the efficiency of the pumping system. Thus, in accordance with the present invention, where a first number of pumps is energized and the efficiency exceeds (above or below depending on the system) a prescribed level, a second, larger number of pumps is energized. Conversely, where the second number of pumps is energized and the efficiency drops below a prescribed level, some of the pumps are deenergized so that only the first number of pumps is energized. Thus, where one pump would have been thought to be more efficient at a particular flow rate, in accordance with the present invention, the efficiency may now be determined to have dropped to a level indicating that a second pump should be energized, or vice versa. The same criteria may be expanded to several pumps by controlling the pumps based upon further prescribed efficiency levels. Control of several pumps in a pumping system is thus achieved which optimizes the efficiency of the system rather than merely optimizes flow, level or pressure alone as had been done heretofore with less than satisfactory results from an energy efficiency standpoint.

BRIEF DESCRIPTION OF THE DRAWINGS

These and other features of the invention will become more readily apparent from the following detailed description taken with the accompanying drawings in which.

DETAILED DESCRIPTION OF THE DRAWINGS

Figure 1:
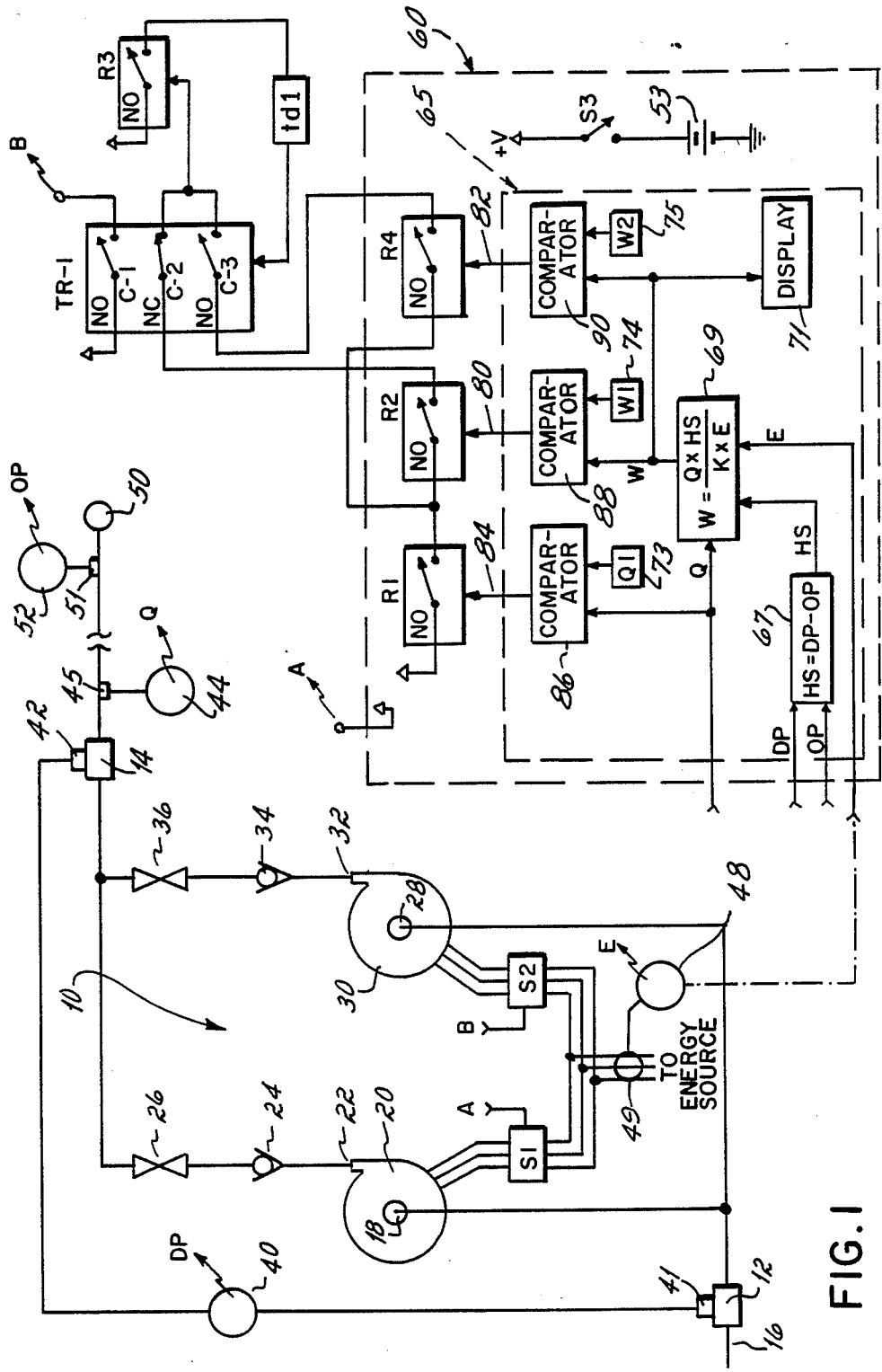
FIG. 1 is a schematic illustration of an apparatus for monitoring and controlling a two pump, fixed speed pumping system for purposes of explaining the principles of the present invention.

With reference to FIG. 1, there is shown a schematic illustration of one embodiment of a fixed speed, two pump pumping system 10 for purposes of explaining the present invention. System 10 is a parallel pump system and includes a plurality of valves, fittings and pumps coupled between an inlet header 12 and an outlet header 14, as will be explained. Inlet header 12 may be coupled to a hydraulic line 16 or other source of fluid. When either of the pumps is energized, pumping system 10 will receive fluid from line 16 and discharge same out of outlet header 14. System 10 may be part of a closed loop system, i.e. outlet header 14 and inlet header 12 are in fluid communication through a utilization device(s) indicated by delivery point 50. An example of a closed loop system would be a building chilled water air conditioning system wherein the utilization devices are a plurality of heat exchange coils or the like with delivery point 50 being positioned near the remotest such coil. Alternatively, system 10 may be part of a open loop system where water, for example, is pumped from inlet header 12 to outlet header 14 whereat the water is removed from the system such as in a drinking water system or a sewage lift station.

Input or suction port 18 of first pump 20 is coupled to inlet header 12. Output 22 of pump 20 is coupled to check valve 24 which communicates with outlet header 14. Pump 20 and valve 24 are coupled together and to inlet and outlet headers 12 and 14 through fittings (not shown). The frictional losses of the fittings (not shown), valve 24 and pump 20 are schematically represented by valve 26 between valve 24 and outlet header 14.

Similarly, input or suction port 28 of second pump 30 is coupled to inlet header 12. Output or discharge port 32 of pump 30 of is coupled to check valve 34 which communicates with outlet header 14. Pump 30 and valve 34 are coupled together and to headers 12 and 14 through fittings (not shown). The frictional losses of the fittings (not shown), valve 34 and pump 30 are represented by valve 36 between valve 34 and outlet header 14. As is well understood, further valves (not shown) may be coupled between inlet header 12 and pump inputs 18 and 28 and selectively opened and closed to permit fluid communication between inlet header 12 and pumps 20 and 30. Also well known is the operation of check valves 24 and 34 which are operable to prevent one energized pump from driving fluid back into the discharge port of a deenergized pump while allowing fluid to be driven by the energized pump to outlet header 14. Thus, when pump 20 and/or pump 30 is energized, fluid will be drawn thru inlet header 12 to suction ports 18 and/or 28, and discharged from discharge ports 22 and/or 32 to be driven out of system 10 through outlet header 14.

Pumps 20, 30 each include a respective motor (not shown) which rotates the impeller (not shown) of the pumps 20, 30. The pumps are powered from an energy source (not shown) such as a 220-volt, three phase electrical system. Coupled between pumps 20 and 30 and the energy source (not shown) are switches S1 and S2, respectively, by which communication between the pumps and the energy source may be controlled. Switches S1, S2 are under control of an evaluator 60 and related relays (all collectively referred to herein as an energizer) which will determine the accurate wire-to-water efficiency (W) of system 10 and provide enable signals A and/or B by which to open or close switches S1 and S2. For example, when enable signal A from evaluator 60 is high or "1" (i.e. output A of evaluator 60 is coupled to a source of supply +V), switch S1 will be turned on (or closed) thereby permitting energy to be coupled from the energy source (not shown) through switch S1 to pump 20 thereby energizing pump 20. On the other hand, if enable signal A is low or "0" (i.e. output A of evaluator 60 is disconnected from a source of supply +V or at ground), switch S1 will be turned off (or open) causing pump 20 to be disconnected from the energy source (not shown) whereby pump 20 is deenergized. Operation of switch S2 is identical to that of switch S1 in response to high or low enable signals B from evaluator 60 and its related relays (the energizer). Thus, when enable signal A is high and enable signal B is low, only one pump will be energized whereas if enable signals A and B are both high, both pumps will be energized.

Coupled to system 10 for communication with evaluator 60 are system differential pressure transmitter 40, flow transmitter 44, watt transmitter 48 and overpressure transmitter 52. The transmitters generate signals utilized by evaluator 60 to determine W and generate the aforementioned enable signals. System differential pressure transmitter 40 is coupled to headers 12 and 14 by one set of transducers 41, 42, respectively, and generates a signal DP indicative of the differential pressure (e.g., in feet of water where the pumped fluid is water) to be utilized by evaluator 60 as will be described. While transmitter 40 is shown coupled to both inlet header 12 and outlet header 14, in certain applications, transmitter 40 may only be coupled to outlet header 14. Such a situation is present when inlet header 12 is placed, for example, in a sump (17 in FIG. 2) which is exposed to atmospheric pressure. When inlet header 12 thus communicates with atmospheric pressure, the pressure at inlet header 12 is a constant (KP). This constant value of KP is to be subtracted from the pressure measured at outlet header 14 to generate the correct differential pressure DP between headers 12 and 14 (this is done in calculator 65 as explained below). Hence, no transducer 41 is necessary at inlet header 12.

Flow transmitter 44 is preferably coupled to system 10 at or near outlet header 14 by a transducer 45 to measure the flow of fluid through system 10 and provide a signal Q indicative thereof to evaluator 60. Similarly, downstream of outlet header 14 at or near a delivery point 50 is coupled a transducer 51 which provides a pressure measurement thereat to system overpressure transmitter 52. Transmitter 52 generates a signal OP which is indicative of an overpressure of system 10 which is the pressure measured by transducer 51 offset by a desired or standard pressure as explained in aforesaid U.S. Pat. No. 4,120,033. Finally, watt transmitter 48 monitors (via transducer 49) the energy utilized in driving pumps 20 and 30 and transmits a signal E to evaluator 60 indicative thereof. As will be appreciated, communication between evaluator 60 and switches S1, S2 as well as transmitters 40, 44, 48 and 52 may be by any desired communication means including wires and/or radio communications.

Evaluator 60 includes a microcomputer system 65 which receives the signals (DP, OP, Q and E) from the various transmitters and utilizes same to determine the actual wire-to-water efficiency (W). Although not shown, the signals are converted into digital signals for use by computer 65 as is well understood. Computer 65 further provides output signals by which to control the state of various relays within and without evaluator 60 to generate the enable signals by which pumps 20 and 30 may be selectively energized and deenergized.

Computer 65 is programmed as indicated by box 67 to generate total dynamic head HS according to the formula $$HS = DP - OP.$$

Figure 2:
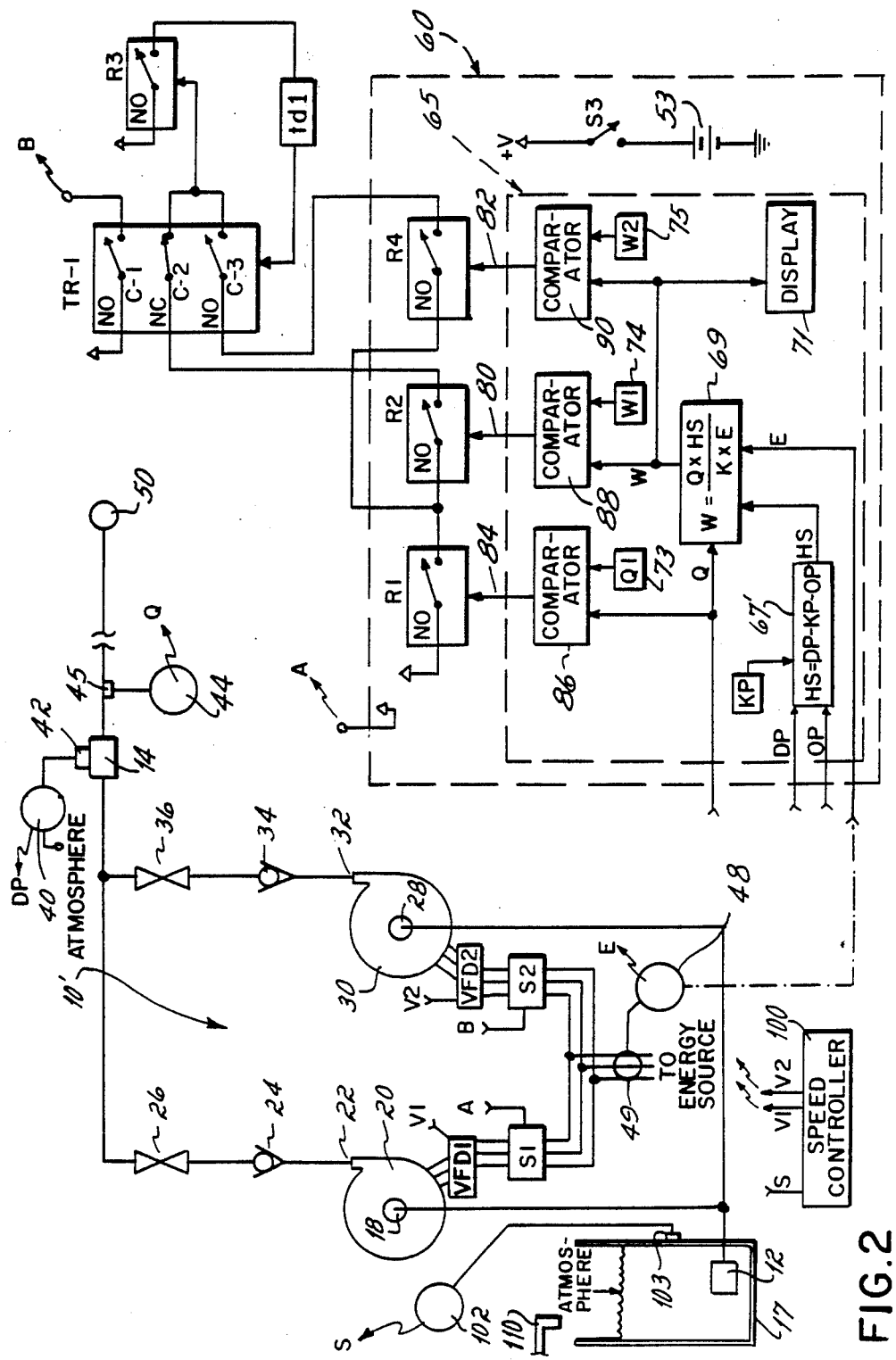
FIG. 2 is a schematic illustration of an apparatus for monitoring and controlling a two pump, variable speed pumping system for purposes of further explaining the principles of the present invention.

For a variable speed pump system 10' as shown in FIG. 2, OP is set equal to 0 (whereby HS=DP) as exemplified by coupling to ground the OP signal input of computer 65. Note that for an atmospheric pumping system such as shown in FIG. 2, the constant pressure or head at inlet header 12 (KP) must be stored in computer 65 and subtracted from DP by program 67' to give an accurate DP (which is equal to HS). For non-atmospheric systems such as a closed loop system, KP is irrelevant because DP is generated by measurements at both the inlet and outlet headers Thus, KP is not shown in FIG. 1. It should be appreciated, however, that as used herein, DP refers to the differential pressure across headers 12, 14 corrected, if necessary, for KP.

Computer 65 is further programmed as indicated by box 69 to determine wire-to-water efficiency (W) according to the formula:

$$W = \frac{Q \times HS}{K \times E}$$

wherein K is a predetermined conversion factor to cause W to be between 0 and 100%. In the exemplary embodiment described herein, the pumped fluid is water, Q is measured in gallons of water per minute, HS is measured in feet of water (DP and OP are likewise so measured) and E is measured in kilowatts. For such units, K is 53.08 foot-gallons per minute per kilowatt.

In order to determine the value of constant K, the following calculations are generally to be followed. First, efficiency is equal to work out divided by work in times 100%. Note that $$\text{work out} = \frac{Q \times HS}{3960} \text{ Horsepower}$$

where Q=system flow in gallons per minute and H=total system head in feet of water. To correlate flow to head for water, $$3690 = \frac{33{,}000 \text{ foot-pounds/horsepower}}{8133 \text{ pounds/gallon per minute}}$$

Similarly, work in=0.746E horsepower where E is in kilowatts. Utilizing the efficiency calculation (work out divided by work in) we get $$W = \frac{Q \times HS}{3960} / .746E \times 100\%$$

or $$W = \frac{Q \times HS}{53.08E}$$

Thus, for water and energy in kilowatts, K=53.08 in the units mentioned above.

The efficiency W determined from block 69 is provided to a display 71 by which an operator (not shown) may monitor the operation of system 10. Further displays (not shown) may be provided for the operator to monitor Q, E, DP, OP and/or HS if desired. The determined W is further utilized by computer 65 for comparison with first and second predetermined efficiency setpoints W1 and W2. As will be explained in more detail later, W is compared to W1 and W2 and the results thereof are provided on computer outputs 80 and 82, respectively. Similarly, Q is compared against a first predetermined flow rate setpoint Q1, and the result thereof is provided on computer output 84.

Figure 4A:
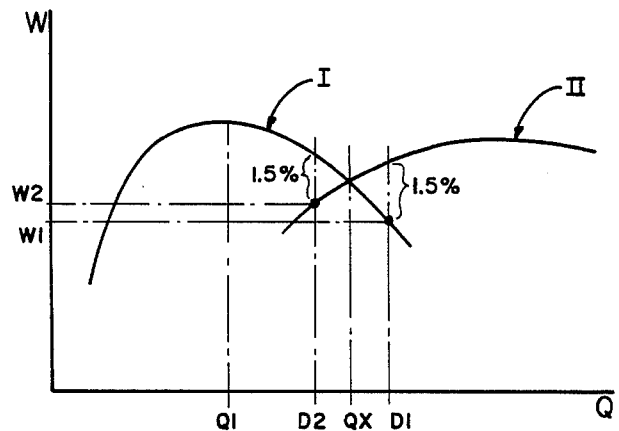
FIGS. 4a and 4b are performance graphs for two different exemplary two pump systems for purposes of explaining operation of the apparatus of FIGS. 1 and 2.
Figure 4B:
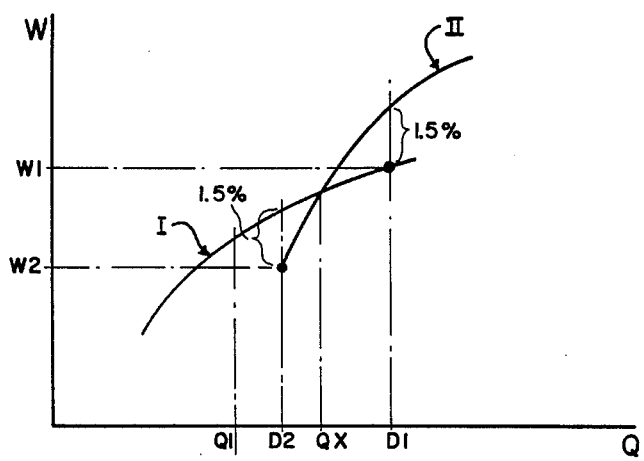

Q1, W1 and W2 are each determined from certain efficiency performance information obtained about the pumps of pumping system 10, and the numbers therefor are stored in memory locations of computer 65 as represented by blocks 73, 74, 75. FIGS. 4a and 4b are examples of efficiency performance curves of two different, two pump systems. From the graphs of FIGS. 4a and/or 4b, setpoints Q1, W1 and W2 are determined.

With reference to FIG. 4a, there is shown a graph with two curves (I and II) which curves relate, at a given total system head HS, the wire-to-water efficiency of one pump at various flow rates (curve I) and the efficiency of two pumps at various flow rates (curve II). As can be seen from FIG. 4a, at some flow rate Qx, the two curves intersect. At flow rates above Qx, the efficiency of one pump decreases while the efficiency of two pumps increases. When the difference between the two curves reaches a selected difference value (preferably 1.5% although other or varying difference values may be employed), then two pumps would be preferred to only one pump. This occurs at a flow designated by line D1 of curve I. Where line D1 intersects curve I, the efficiency of one pump is W1 while the efficiency of two pumps at that same flow would be W1 plus 1.5%. Hence, if only one pump is energized, it is desired that a second pump be energized. The value of W1 is stored at memory location 74. Note that the second pump is to be energized when W exceeds W1, that is when W is equal to or less than W1. Hence, whenever W is equal to or less than W1 and only one pump is energized, two pumps should be energized.

Likewise, W2 is determined as that wire-to-water efficiency along curve II at flow rates below Qx at which one pump would be more efficient than two by a difference value (e.g., 1.5%) at the same flow rate. This flow rate defines a line D2 and where line D2 and curve II intersect determines W2 which is entered in memory location 75 of computer 65. When W is less than or equal to W2 and two pumps are energized, only one pump should be energized and the other(s) deenergized. As a safeguard, it is desirable to operate the least number of pumps (e.g., only one) below a certain flow rate because two pumps would be severely inefficient. For a system represented by FIG. 4a, this flow rate is that flow at which efficiency for one pump is at a maximum. The flow rate thereat is stored at memory location 73 as Q1 and will be utilized to deenergize (or prevent energization) of the second pump if Q is less than Q1.

FIG. 4b is a chart of another two pump system similar to FIG. 4a but showing that with some pumps, line D1 will intersect curve I as the wire-to-water efficiency of one pump is still increasing. In this situation, a second pump should still be energized but only when W is equal to or greater than W1. Hence, for this type of system, W is said to exceed W1 when the former is equal to or greater than W1 whereas in a system corresponding to FIG. 4a, W exceeds W1 when W is less than or equal to W1. Also, Q1 is no longer at the maximum efficiency of one pump. Rather, Q1 is selected as that flow below which two pumps is too severely inefficient and, hence, a second pump should not be energized. W2 is determined in the same manner as done with FIG. 4a.

FIGS. 4a and 4b may be generated in a couple of different manners. System 10 could be constructed and, at a given total dynamic head HS, the flow varied and W monitored from display 71 and/or otherwise recorded first for one pump energized and then for two pumps energized. The results could be plotted to generate curves I and II like those of one of FIGS. 4a and 4b. Alternatively, and preferably, graphs such as those shown in FIGS. 4a and 4b are generated empirically based upon data provided by the manufacturer(s) of the pumps.

The manufacturer(s) will typically provide the efficiency for the motor and/or pump impeller for any given pump at a specified pump head. This data is manipulated, such as by a computer, to generate efficiency versus flow data from which to generate graphs like FIGS. 4a and 4b. The calculations, whether done by computer or manually, follow known procedures such as included in forms 2.022A and 2.505 published by Systecon, Inc., the assignee herein, in Brochure No. 2.022A-INS (Copyright 1977), the disclosure of which is incorporated herein by reference. Note that the empirical approach assumes that friction losses are generally constant at a given flow or head. Hence, after Q1, W1 and W2 are selected, it may be necessary to run some tests at various flows and heads to be certain that the setpoints are proper. It is also possible that empirically generated curves are somewhat in error due to assumptions made, for example, by the manufacturers.

Returning to FIG. 1, evaluator 60 is energized by closing switch S3 to couple energy thereto (represented by battery B although preferably a D.C. voltage and current provided by regulating an AC source). Enable signal A is normally low, but goes high upon closing switch S3 (it is coupled directly to source +V) thus energizing pump 20. Note that enable signal B is low due to the normally open contact C-1 of relay TR-1 thus preventing energization of pump 30.

As will be recognized by those of ordinary skill in the art, contact C-1 of relay TR-1 will not close until sometime after the contacts of relays R1 and R2 close thereby providing a signal to relay R3 (through the normally closed contact C-2 of relay TR-1) to close the normally open contact thereof. Due to time delay tdl (the on/off delays of time delay relay TR-1), the source of supply +V will not be coupled from relay R3 to the control or coil input of relay TR-1 until after the on-delay of tdl. After the on-delay, relay TR-1 will switch states such that contacts C-1 and C-3 are closed (enable signal B will go high) and contact C-2 is open. If, after the state of relay TR-1 is switched, the contact at relay R4 is closed (it is normally open unless output 82 of computer 65 is high), the state of relay R3 will remain in the closed contact state thereby maintaining the contacts of relay TR-1 in the latter state. If, however, the contact of relay R4 opens, the contact of relay R3 will likewise open, and after the off-delay of time delay tdl, the contacts of relay TR-1 will return to their original state and enable signal B will go low.

Also, if output 84 from computer 65 is low, the contact of relay R1 will be open. In which event either relay TR-1 cannot switch states so as to close contact C-1 (thereby preventing enable signal B from going high so that pump 30 cannot be energized), or will cause the contact of relay R3 to open and ultimately cause the state of relay TR-1 to switch thereby opening contact C-1 (enable signal B goes low) deenergizing pump 30.

Relay R1 is responsive to output 84 which goes high only when Q is equal to or greater than Q1 as exemplified by comparator 86. Thus, enable signal B will be held low at least until Q is equal to or greater than Q1. Similarly, switch R2 is responsive to output 80 which goes high only when W exceeds W1 as previously discussed and as exemplified by comparator 88. That is, until W is equal to or less than W1 (for a system corresponding to FIG. 4a) or W is equal to or greater than W1 (for a system corresponding to FIG. 4b), output 80 is low whereby the contact of relay R2 will remain open. Relay R4 is responsive to output 82 which goes high when W is equal to or greater than W2 as exemplified by comparator 90. Thus, if relay TR-1 is in the second state (contact C-1 closed), the contact of relay R4 will typically be closed thereby maintaining relay TR-1 in the second state. However, if the efficiency of the two pumps drops, such as indicated by line D2 of FIGS. 4a and 4b, only one pump should be energized. Consequently, when W drops below W2, output 82 goes low, and the contact of relay R4 opens resulting in relay TR-1 switching back to its original state whereby pump 30 will be deenergized.

As is clear, only one pump is energized when relay TR-1 is in the original state whereas two pumps are energized when relay TR-1 is switched to the second state. Also, when relay TR-1 is in the first state, the state of relay R4 is irrelevant while the state of relay R2 is irrelevant when relay TR-2 is in the second state due to the normally closed versus normally open state of contacts C-2 and C-3, respectively. Thus, if only one pump is energized and W exceeds a first predetermined efficiency W1, then an enable signal will go high to energize a second pump. Conversely, if two pumps are energized and W falls below a second predetermined efficiency W2, then an enable signal will go low whereby the second pump will be deenergized so that only one pump is energized. Additionally, if the flow rate falls below a predetermined flow rate, the enable signal will be forced low to deenergize or prevent energization of the second pump. The foregoing provides selective energization of pumps in a multi-pump system in order to optimize efficiency of the system.

Time delay tdl is provided to avoid any "race" problems and to give time for pump 30 to either energize or deenergize before enable signal B may again change state. The on-delay is preferably about 10 seconds, and the off-delay is about 10 minutes. These time delays are preferred so that the evaluator is not rapidly causing pumps to be energized and deenergized. Rather, it should be recognized that some of the pumps which may be controlled in response to enable signals A and-/or B from evaluator 60 may be quite large, such as 150 or 200 horsepower pumps, and thus should not be cycled on and off in any sort of rapid fashion. Thus, having a time delay insures that the relays of the energizer do not "race" or unnecessarily toggle the enable signals which would require substantial energy to cycle the pumps and might cause unnecessary wear and perhaps damage to the pumps.

Operation of the above-described system 10 may be modified to utilize variable speed pumps, such as system 10' as shown in FIG. 2. System 10' includes, for example, variable frequency drives VFD1 and VFD2 as well as speed controller 100 and an associated system parameter transmitter 102 which transmits a system parameter signal S as measured by transducer 103. As shown in FIG. 2, inlet header 12 may be placed within a sump 17, the fluid level of which is to be maintained. System 10' is an atmospheric system. Hence, differential pressure transmitter 40 is coupled to outlet header 14 by transducer 42 but is not directly coupled to inlet header 12. Instead, transmitter 40 (or transducer 42) is referenced to atmosphere (as is inlet header 12) whereby the signal DP from transmitter 40 (minus KP) is indicative of the differential pressure between the headers 12 and 14.

A system parameter transmitter 102 is coupled to sump 17 via transducer 103 which monitors the level of fluid in sump 17, whereby to cause the speed of pumps 20 and 30 to vary relative to the rate at which fluid flows into sump 17 from a source shown as a pipe 110. Alternatively, transmitter 102 and transducer 103 could be positioned downstream of outlet header 14 at delivery point 50, for example, to monitor pressure, flow, temperature, or level or the like thereat. Transmitter 102 provides a system parameter signal S which is utilized by a speed controller 100 to control the speed of variable speed pumps 20 and 30 as is well understood.

Speed controller 100 is preferably an S9501 or S9501B receiver/controller available from Systecon Inc. in Cincinnati, Ohio, the assignee of the present invention. Speed controller 100 receives signal S from transmitter 102 and evaluates the same to generate one or more signals V1 and V2 which are transmitted to variable frequency drive controllers VFD1 and VFD2 coupled between pumps 20 and 30 and switches S1 and S2 to vary the frequency and/or amount of energy coupled to pumps 20 and 30 thereby varying the speed of the same. Note that the energy to drives VFD2 and VFD2 as well as pumps 20 and 30 is now monitored by transducer 49 such that signal E fairly represents all energy input to system 10'.

With a variable speed pump system, such as system 10', there is no overpressure OP measurement. Hence, there is no related transmitter, and OP is assumed equal to zero (as indicated by grounding OP signal input to computer 65). Other than the foregoing, operation of system 10' and the energizer (evaluator 60 and related relays) is identical to that of FIG. 1. Note that to determine the performance curves of FIGS. 4a and 4b, the efficiency of the drives VFD1 and VFD2 must also be provided by the manufacturer and form 2.506 utilized (which is included in the aforementioned Brochure No. 2.022A-INS) rather than form 2.505.

Figure 3:
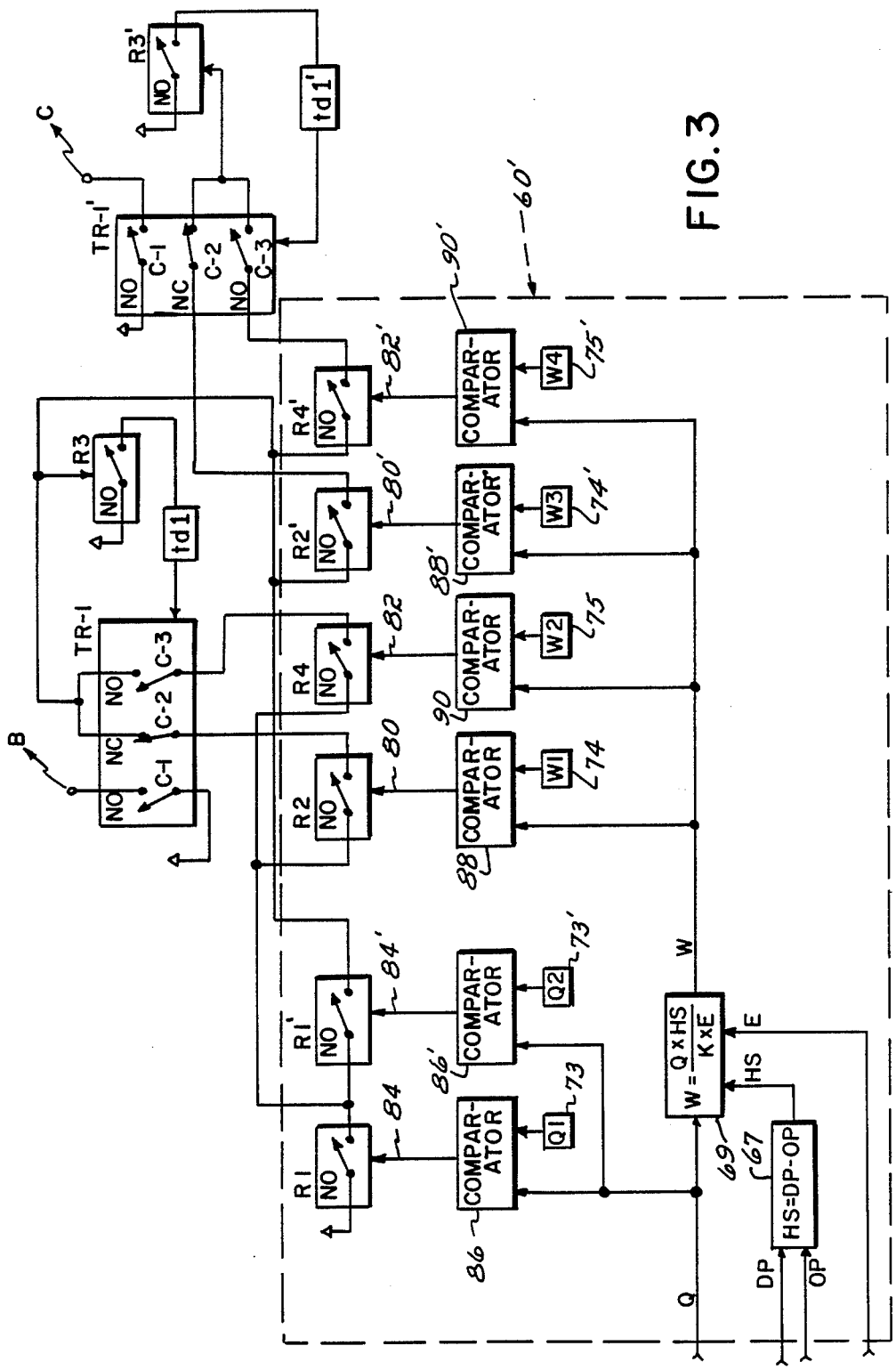
FIG. 3 is a schematic illustration of an energizer to control selective energization of pumps in a three pump system for purposes of further explaining the principles of the present invention.

Pumping systems 10 and 10' are merely exemplary systems for purposes of explaining the present invention. Either of these systems could be expanded to three or more pumps with related valves, fittings, switches, and, if appropriate, variable flow drives. For a three pump system, for example, a third enable signal C could be provided by an evaluator 60' and related relays as shown in the energizer of FIG. 3 to control a third switch by which to selectively energize and deenergize the third pump.

Figure 5:
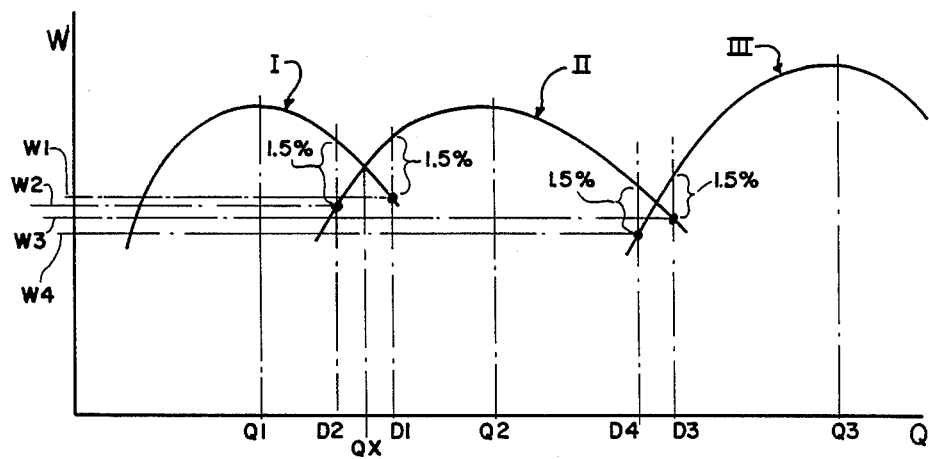
FIG. 5 is a performance graph of an exemplary three pump system for purposes of explaining operation of the evaluator of FIG. 3.

Evaluator 60' operates in a manner quite similar to evaluator 60. In particular, Q1, W1 and W2 are compared to Q and W in precisely the same manner to control the state of relays R1, R2, R3, R4 and TR-1. A three pump system would also preferably be controlled by a second predetermined flow rate Q2 and third and fourth predetermined efficiency set points W3 and W4, respectively, obtained from a performance graph as shown in FIG. 5.

A performance graph for a three pump system is developed in the same manner as developed to FIGS. 4a and 4b but with the addition of third curve III representing efficiency versus flow at the specific head HS for three pumps. From FIG. 5, Q1, W1 and W2 are again determined. Also, a second predetermined flow rate setpoint Q2 is determined and stored at memory location 73'. Flow rate Q2 is selected as the flow above which the second pump should always be energized and the third pump selectively energized and deenergized. At flow rates below Q2, the third pump is to be deenergized, and the second pump selectively energized and deenergized.

Third and fourth predetermined efficiency set points W3 and W4 are selected in the same manner as W1 and W2. Thus, the flow (above Q2) at which three pumps is at least 1.5% more efficient than two pumps defines line D3. Where line D3 intersects curve II is W3. Also, the flow (above Q2) at which two pumps is at least 1.5% more efficient than three pumps defines line D4. Where line D4 intersects curve III is W4. W3 and W4 are stored in memory locations 74' and 75', respectively, and compared against W as was done with W1 and W2.

Similarly, outputs 84', 80' and 82' control the state of relays R1', R2', R3', R4' and TR-1' in a manner identical to that in which outputs 84, 80 and 82 control the state of relays R1, R2, R3, R4 and TR-1. The output of contact C-1 of relay TR-1' provides the aforementioned enable signal C. Note that when the contact of relay R1' closes (when Q is above Q2 as indicated by comparator 80'), the contact of relay R3 will be forced to close causing enable signal B to be held high to energize the second pump. When Q is below Q2, relay R1' opens (relay TR-1' will be forced to its original state so that enable signal C is held low to deenergize the third pump) and relay R3 again responds as previously described in the case of a two pump system.

By virtue of the foregoing, (i) for flow rates below Q2, at most two pumps will be energized such that if only one pump is energized and efficiency W exceeds W1 (above or below depending upon the pumping system), two pumps will be energized, but if two pumps are energized and efficiency W falls below W2, the second pump will be deenergized so that only one pump is energized, and (ii) for flow rates above Q2, at least two pumps will be energized such that if two pumps are energized and efficiency W exceeds W3 (above or below depending upon the pumping system), three pumps will be energized, but if three pumps are energized and efficiency falls below W4, the third pump will be deenergized so that only two pumps are energized. Additionally, if the flow rate falls below Q1, which is less than Q2, the second and third pumps are deenergized and/or prevented from being deenergized.

The curves of FIGS. 4a, 4b and 5 are generated at one total dynamic head HS and indicate efficiency setpoints relative to flow. However, in operation, control of the pumps is primarily dependent upon efficiency set points irrespective of actual flow (except to the extent the flow setpoints are involved). Hence, if one pump becomes very inefficient even at a flow rate only slightly above Q1 (but below Qx for example), a second pump will be energized along with the first pump to thereby improve efficiency.

While not mentioned, a high flow set point comparator could be employed along with any of the foregoing. The high flow set point may be determined from the graphs of FIGS. 4a, 4b and/or 5 to be that flow at or above which less than all pumps operating would be severely inefficient notwithstanding that the efficiency of all the pumps begins to suffer. By way of example, the high flow setpoint would be Q3 in FIG. 5. Of course, if the system required such a high flow set point consideration should be given to more efficient and/or more numbers of pumps as the pumping system is apparently underdesigned. In any event, a further comparison with Q could be made to the high flow set point whereby if Q is equal to or greater than the high flow set point, all enable signals are forced high.

By virtue of the foregoing, a method and apparatus by which to monitor the wire-to-water efficiency of a multi-pump system and by which to selectively control the pumps thereof is provided. While the foregoing has been shown with reference to wire-to-water efficiency and energy input in kilowatts, the pumps may be driven in other ways. For example, the pumps could be motor-driven by fuel operated motors. Thus, energy input E might be in gallons per hour or similar units, and the conversion factor K would have to be modified accordingly. Similarly, wire-to-water efficiency would typically be renamed fuel-to-water efficiency although for purposes herein, the term wire-to-water efficiency has been used throughout.

The systems have been disclosed with reference to pump 20 always being energized and pump 30 and/or a third pump (not shown) being selectively energized and deenergized. It should be recognized that the positioning of the pumps could be modified, and/or the program of calculator 65 and the logic of the energizers (evaluators 60 and/or 60' and related relays) modified such that different ones of enable signals A, B and C may be selected in some order other than ABC order (e.g. CAB order or CBA order, etc.). Further, pump 20 and pump 30 have been indicated to be single pumps although each could be a plurality of pumps which are selectively energized and deenergized in accordance with the foregoing.

While evaluators 60 and 60' have been disclosed as including a computer such as in the S9670 Series Universal Instrument available from the assignee herein, and which include an Intel 8085 Microprocessor programmed to accomplish the foregoing determinations and comparisons, it is apparent that analog calculations could be made such as those disclosed in aforesaid U.S. Pat. No. 4,120,033 for wire-to-water efficiency and that analog comparators could be used for the various predetermined flow rates and efficiency set points by which to control actuation of relays or the like to selectively energize and deenergize the pumps.

Finally, the pumping systems described herein by way of example have been disclosed for pumping water although other fluids including air could be pumped (if air is pumped, pumps 20 and 30 could be fans, for example) so long as correction for K is made to account for the difference in fluid.

Having described the invention, what is claimed is:

1. Apparatus for monitoring a pumping system having a plurality of pumps coupled between an inlet header and an outer header of the system, the apparatus comprising:
   (a) first transducer means for measuring fluid flow rate of the pumping system at the outlet header of the pumping system;
   (b) second transducer means for measuring total dynamic head between the inlet and outlet headers of the system;
   (c) third transducer means for measuring energy utilizing by the system to drive the pumps;
   (d) fourth means communicating with said first, second, and third transducer means for determining wire-to-water efficiency of the system correlated to said measured fluid flow rate, total dynamic head and energy utilized; and
   means for indicating to an operator said wire-to-water efficiency so that the operator may monitor operation of the system.

2. The apparatus of claim 1 further including:
   fifth means for measuring a downstream overpressure downstream of the outlet header wherein said wire-to-water efficiency of the system is further correlated to said downstream overpressure.

3. The apparatus of claim 1 further including:
   means for adapting said second transducer means to be coupled to the inlet header of the system.

4. The apparatus of claim 1, said fourth means including:
   calculator means for calculating said wire-to-water efficiency according to the formula:

$$W = \frac{Q \times HS}{K \times E}$$

wherein W is a number representing said wire-to-water efficiency, Q is a number representing said fluid flow rate, HS is a number representing said total dynamic head, E is a number representing said energy utilized, and K is a conversion factor number, said calculator means having an output communicating W to said means for indicating.

5. The apparatus of claim 4 further including:
   fifth means for measuring differential pressure DP between the inlet and outlet headers of the system;
   sixth means for measuring an overpressure OP downstream of the outlet header; and
   means responsive to said fifth and sixth means for determining HS by the formula:

HS = DP − OP.

6. The apparatus of claim 4 further including:
   fifth means for measuring differential pressure DP between the inlet and outlet headers of the system; and
   means responsive to said fifth means for determining HS by the formula:

HS = DP.

7. A pumping system comprising:
   a plurality of pumps for pumping fluid when coupled to a source of energy;
   an inlet header coupled to the pumps to provide a source of fluid to be pumped by the pumps;
   an outlet header coupled to the pumps to provide an outlet for pumped fluid;
   first transducer means coupled to said outlet header for measuring fluid flow rate of the pumped fluid;
   second transducer means coupled to said outlet header for measuring total dynamic head between said inlet and outlet headers;
   third transducer means communicating with a source of energy coupled to said pumps for measuring energy utilized to drive said pumps;
   fourth means communicating with said first, second, and third transducer means for determining wire-to-water efficiency correlated to said measured flow rate, total dynamic head and energy utilized; and
   means for indicating to an operator said wire-to-water efficiency so that the operator may monitor operation of the system.

8. The pumping system of claim 7 wherein said means for indicating is a display.

9. The pumping system of claim 7 wherein fourth means includes calculator means for calculating said wire-to-water efficiency according to the formula:

$$W = \frac{Q \times HS}{K \times E}$$

wherein W is a number representing said wire-to-water efficiency, Q is a number representing said fluid flow rate, HS is a number representing said total dynamic head, E is a number representing said energy utilized, and K is a conversion factor number, said calculator means having an output communicating W to said means for indicating.

10. A method for monitoring a pumping system having a plurality of pumps coupled between an inlet header and an outlet header of the system, the method comprising:

applying energy to the system to drive the pumps so as to cause fluid to flow through the system from the inlet header and out of the outlet header;

measuring fluid flow rate through the system;

measuring total dynamic head of the system between the inlet and outlet headers of the system; measuring energy utilized by the system to drive the pumps;

generating wire-to-water efficiency of the system correlated to said measured fluid flow rate, total dynamic head and energy utilized; and indicating to an operator said wire-to-water efficiency so that the operator may monitor operation of the system.

11. The method of claim 10 further including:
measuring an overpressure downstream of the outlet header, wherein said wire-to-water efficiency is further correlated to said downstream overpressure.

12. A method for monitoring a pumping system having a plurality of pumps coupled between an inlet header and an outlet header of the system, the method comprising:

applying energy to the system to drive the pumps so as to cause fluid to flow through the system from the inlet header and out of the outlet header;

measuring fluid flow rate Q through the system;

measuring total dynamic head HS between the inlet and outlet headers of the system;

measuring energy E utilized by the system to drive the pumps;

determining wire-to-water efficiency W of the system according to the formula:

$$W = \frac{Q \times HS}{K \times E}$$

wherein K is a predetermined conversion factor; and
indicating to an operator said wire-to-water efficiency so that the operator may monitor operation of the system.

13. The method of claim 12 further comprising:
measuring differential pressure DP between the inlet and outlet headers of the system;
measuring an overpressure OP downstream of the outlet header; and
determining HS by the formula:

$HS = DP - OP.$

14. The method of claim 12 further comprising:
measuring differential pressure DP between the inlet and outlet headers of the system; and
determining HS by the formula:

$HS = DP.$

* * * * *

UNITED STATES PATENT AND TRADEMARK OFFICE
CERTIFICATE OF CORRECTION

PATENT NO. : 4,945,491
DATED : July 31, 1990
INVENTOR(S) : James B. Rishel

It is certified that error appears in the above-identified patent and that said Letters Patent is hereby corrected as shown below:

Col. 3, line 27, after "systems" insert -- . --.

Col. 3, line 54, after "header" insert -- . --.

Col. 3, line 56, after "DP" insert -- . --.

Col. 6, line 62, after "headers" insert -- . --.

Col. 7, line 25, "3690" should be -- 3960 --.

Signed and Sealed this

Seventeenth Day of March, 1992

Attest:

HARRY F. MANBECK, JR.

*Attesting Officer*     *Commissioner of Patents and Trademarks*